(12) United States Patent
Lei et al.

(10) Patent No.: US 10,700,824 B2
(45) Date of Patent: Jun. 30, 2020

(54) NON-ORTHOGONAL COMMUNICATION

(71) Applicant: Lenovo Innovations Limited (Hong Kong), Hong Kong (CN)

(72) Inventors: Haipeng Lei, Beijing (CN); Chenxi Zhu, Beijing (CN); Yuechao Guo, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 0 days.

(21) Appl. No.: 16/325,152

(22) PCT Filed: Aug. 12, 2016

(86) PCT No.: PCT/CN2016/094895
§ 371 (c)(1),
(2) Date: Feb. 12, 2019

(87) PCT Pub. No.: WO2018/027911
PCT Pub. Date: Feb. 15, 2018

(65) Prior Publication Data
US 2019/0229863 A1    Jul. 25, 2019

(51) Int. Cl.
*H04L 5/00* (2006.01)
*H04W 72/04* (2009.01)

(52) U.S. Cl.
CPC .......... *H04L 5/0014* (2013.01); *H04L 5/0053* (2013.01); *H04L 5/0094* (2013.01); *H04W 72/044* (2013.01); *H04W 72/0413* (2013.01)

(58) Field of Classification Search
CPC .................................................... H04W 72/04
See application file for complete search history.

(56) References Cited

U.S. PATENT DOCUMENTS 10,524,105 B2 * 12/2019 Lee .................. H04W 4/90

FOREIGN PATENT DOCUMENTS

| CN | 104869655 A | 8/2015 |
|---|---|---|
| CN | 105472752 A | 4/2016 |
| CN | 105790890 A | 7/2016 |

(Continued)

OTHER PUBLICATIONS

Patent Cooperation Treaty, "International Search Report", PCT/CN2016/094895, dated May 17, 2017, pp. 1-3.

(Continued)

*Primary Examiner* — Chandrahas B Patel
(74) *Attorney, Agent, or Firm* — Kunzler Bean & Adamson

(57) ABSTRACT

Apparatuses, methods, and systems are disclosed for non-orthogonal communication. One apparatus includes a transmitter that transmits a first signal to a first device for indicating a first resource in a control region of a carrier bandwidth. The first resource is used by the first device for transmitting first control information, and the first control information includes first non-orthogonal layer information. The apparatus also includes a receiver that receives the first control information from the first resource, and receives first data in a data region of the carrier bandwidth. The data region includes multiple non-orthogonal layers. The apparatus includes a processor that decodes the first control information, and decodes the first data based on the first control information.

23 Claims, 9 Drawing Sheets

(56) References Cited

FOREIGN PATENT DOCUMENTS

| CN | 105827376 A | 8/2016 |
|---|---|---|
| CN | 105848165 A | 8/2016 |

OTHER PUBLICATIONS

Patent Cooperation Treaty, "Written Opinion of the International Searching Authority", PCT/CN2016/094895, dated May 17, 2017, pp. 1-4.
Qualcomm Incorporated, "Candidate NR Multiple Access Schemes", 3GPP TSG-RAN WG1 #84b R1-163510, Apr. 11-15, 2016, pp. 1-5.
CATT, "Candidate Solution for New Multiple Access", 3GPP TSG RAN WG1 Meeting #84bis R1-163383, Apr. 11-15, 2016, pp. 1-4.
LG Electronics, "Considerations on DL/UL multiple access for NR", 3GPP TSG RAN WG1 Meeting #84bis R1-162517, Apr. 11-15, 2016, pp. 1-4.
ZTE, "Discussion on multiple access for new radio interface", 3GPP TSG RAN WG1 Meeting #84bis R1-162226, Apr. 11-15, 2016, pp. 1-12.
NTT DOCOMO, Inc., "Initial views and evaluation results on non-orthogonal multiple access for NR uplink", 3GPP TSG RAN WG1 Meeting #84bis R1-163111, Apr. 11-15, 2016, pp. 1-6.
Intel Corporation, "Multiple access schemes for new radio interface", 3GPP TSG RAN WG1 Meeting #84bis R1-162385, Apr. 11-15, 2016, pp. 1-4.
Huawei, Hisilicon, "Overview of non-orthogonal multiple access for 5G", 3GPP TSG RAN WG1 Meeting #84bis R1-162153, Apr. 11-15, 2016, pp. 1-8.

* cited by examiner

NON-ORTHOGONAL COMMUNICATION

FIELD

The subject matter disclosed herein relates generally to wireless communications and more particularly relates to non-orthogonal communication.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Downlink Control Information ("DCI"), Downlink ("DL"), Downlink Pilot Time Slot ("DwPTS"), Enhanced Clear Channel Assessment ("eCCA"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Licensed Assisted Access ("LAA"), Load Based Equipment ("LBE"), Listen-Before-Talk ("LBT"), Long Term Evolution ("LTE"), Machine Type Communication ("MTC"), Multiple Input Multiple Output ("MIMO"), Multi User Shared Access ("MUSA"), Negative-Acknowledgment ("NACK") or ("NAK"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliable and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, to avoid resource collision in uplink communication, the networks adopt orthogonal multiple access ("OMA"). The networks may also use scheduling-based uplink transmission so that the orthogonal resources are assigned for different UEs. Moreover, any uplink communication (e.g., except PRACH) may be scheduled and/or controlled by an eNB. As compared to OMA, non-orthogonal multiple access ("NOMA") may support signal superposition in an orthogonal resource. Accordingly, NOMA may enhance spectrum utilization efficiency, such as in cases of overloaded transmission. Moreover, since NOMA may separate superposed signals at the receiver by using more advanced algorithms, NOMA may support reliable and low latency grant-free transmission. Such transmission may be used for massive MTC and/or URLLC.

In some configurations, there may be no clear difference between autonomous, grant-free, and/or contention based UL transmission. In certain configurations, contention based UL transmission may include autonomous, grant-free, and/or grant-less transmission.

In configurations that use NOMA, (e.g., SCMA, MUSA/RSMA, PDMA) different UEs may be differentiated by different spare codewords, scrambling codes, and/or transmitting vectors transmitted by UEs and then combined through a channel, so that a receiver may separate the superposed signals by using advanced algorithms (e.g., message passing algorithm ("MPA") for SCMA and PDMA, successive interference cancellation ("SIC") for MUSA and PDMA, and matching filter ("MF") for RSMA). Certain receiver algorithms may have better performance at the cost of more complexity. Considering that an eNB may be able to handle higher complexity than a UE, NOMA may be better for uplink transmission than downlink transmission. When NOMA is combined with UL grant-less/contention based transmission, it may support reliable and low latency UL transmission, which may be used for massive MTC and URLLC.

Nevertheless, if the grant-less UL transmission is directly introduced, it may result in problems with eNB reception due to the eNB not being aware of time-frequency resources, a modulation and coding scheme ("MCS"), HARQ process identification ("ID"), redundancy version ("RV"), and/or new data indicator ("NDI"), and so forth for a transmitting UE. Without the information of time-frequency resources, the eNB may blindly detect each possibility of resource usage. Such blind detection may result in excessive complexity and may use too much processing time. Moreover, without MCS information, an eNB may not be able to decode received data. Furthermore, without information corresponding to HARQ process ID, RV, and NDI, an eNB may not be able to differentiate whether the received data is retransmitted data, is new data, corresponds to a particular HARQ process, and/or corresponds to a particular RV.

BRIEF SUMMARY

Apparatuses for non-orthogonal communication are disclosed. Methods and systems also perform the functions of the apparatus. In one embodiment, the apparatus includes a transmitter that transmits a first signal to a first device for indicating a first resource in a control region of a carrier bandwidth. In such an embodiment, the first resource is used by the first device for transmitting first control information, and the first control information includes first non-orthogonal layer information. The apparatus also includes a receiver that receives the first control information from the first resource, and receives first data in a data region of the carrier bandwidth. In such embodiments, the data region includes multiple non-orthogonal layers. The apparatus includes a processor that decodes the first control information, and decodes the first data based on the first control information.

In one embodiment, the transmitter transmits a second signal to a second device for indicating a second resource in the control region of the carrier bandwidth. In such embodiments, the second resource is used by the second device for transmitting second control information, and the second control information includes second non-orthogonal layer information. In a further embodiment, the receiver receives the second control information from the second resource, and receives second data in the data region of the carrier bandwidth. In such embodiments, the first data and the second data are received on different non-orthogonal layers. In such embodiments, the processor decodes the second control information, and decodes the second data based on the second control information. In certain embodiments, the first resource and the second resource are different.

In some embodiments, the carrier bandwidth includes multiple subchannels, and a bandwidth of each subchannel of the multiple subchannels is approximately the same. In various embodiments, each subchannel of the multiple subchannels includes the control region and the data region, and the control region and the data region are multiplexed in a time domain. In certain embodiments, each subchannel of the multiple subchannels includes the control region and the data region, and the control region and the data region are multiplexed in a frequency domain. In one embodiment, the carrier bandwidth includes the control region and the data region, the data region includes multiple subchannels, and a bandwidth of each subchannel of the multiple subchannels is approximately the same. In some embodiments, the first resource and the data region are on a same non-orthogonal layer. In various embodiments, the first resource and the data region are on different non-orthogonal layers.

In certain embodiments, the first control information includes information corresponding to: a subchannel index; a number of subchannels; a hybrid automatic repeat request process identification; a new data indicator; a redundancy version; a modulation and coding scheme; a non-orthogonal layer index; a hybrid automatic repeat request acknowledgment; or any combination thereof. In some embodiments, a non-orthogonal layer index corresponding to the first data is derived from an index of the first resource.

A method for non-orthogonal communication, in one embodiment, includes transmitting a first signal to a first device for indicating a first resource in a control region of a carrier bandwidth. In such an embodiment, the first resource is used by the first device for transmitting first control information, and the first control information includes first non-orthogonal layer information. The method also includes receiving the first control information from the first resource. The method includes receiving first data in a data region of the carrier bandwidth. In such a method, the data region includes multiple non-orthogonal layers. The method also includes decoding the first control information. The method includes decoding the first data based on the first control information.

In one embodiment, an apparatus includes a receiver that receives a signal for indicating a resource in a control region of a carrier bandwidth. In such an embodiment, the resource is used to transmit control information, and the control information includes non-orthogonal layer information. The apparatus also includes a processor that generates the control information and data corresponding to the control information. The apparatus includes a transmitter that transmits the control information on the resource, and transmits the data in a data region of the carrier bandwidth. In such embodiments, the data region includes multiple non-orthogonal layers.

In one embodiment, the carrier bandwidth includes multiple subchannels, and a bandwidth of each subchannel of the multiple subchannels is approximately the same. In a further embodiment, each subchannel of the multiple subchannels includes the control region and the data region, and the control region and the data region are multiplexed in a time domain. In some embodiments, each subchannel of the multiple subchannels includes the control region and the data region, and the control region and the data region are multiplexed in a frequency domain. In certain embodiments, the carrier bandwidth includes the control region and the data region, the data region includes multiple subchannels, and a bandwidth of each subchannel of the multiple subchannels is approximately the same.

In some embodiments, the resource and the data region are on a same non-orthogonal layer. In various embodiments, the resource and the data region are on different non-orthogonal layers. In certain embodiments, the control information includes information corresponding to: a subchannel index; a number of subchannels; a hybrid automatic repeat request process identification; a new data indicator; a redundancy version; a modulation and coding scheme; a non-orthogonal layer index; a hybrid automatic repeat request acknowledgment; or any combination thereof. In one embodiment, a non-orthogonal layer index corresponding to the data is derived from an index of the resource.

A method for non-orthogonal communication, in one embodiment, includes receiving a signal for indicating a resource in a control region of a carrier bandwidth. In such an embodiment, the resource is used to transmit control information, and the control information includes non-orthogonal layer information. The method also includes generating the control information and data corresponding to the control information. The method includes transmitting the control information on the resource. The method includes transmitting the data in a data region of the carrier bandwidth. In such embodiments, the data region includes multiple non-orthogonal layers.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
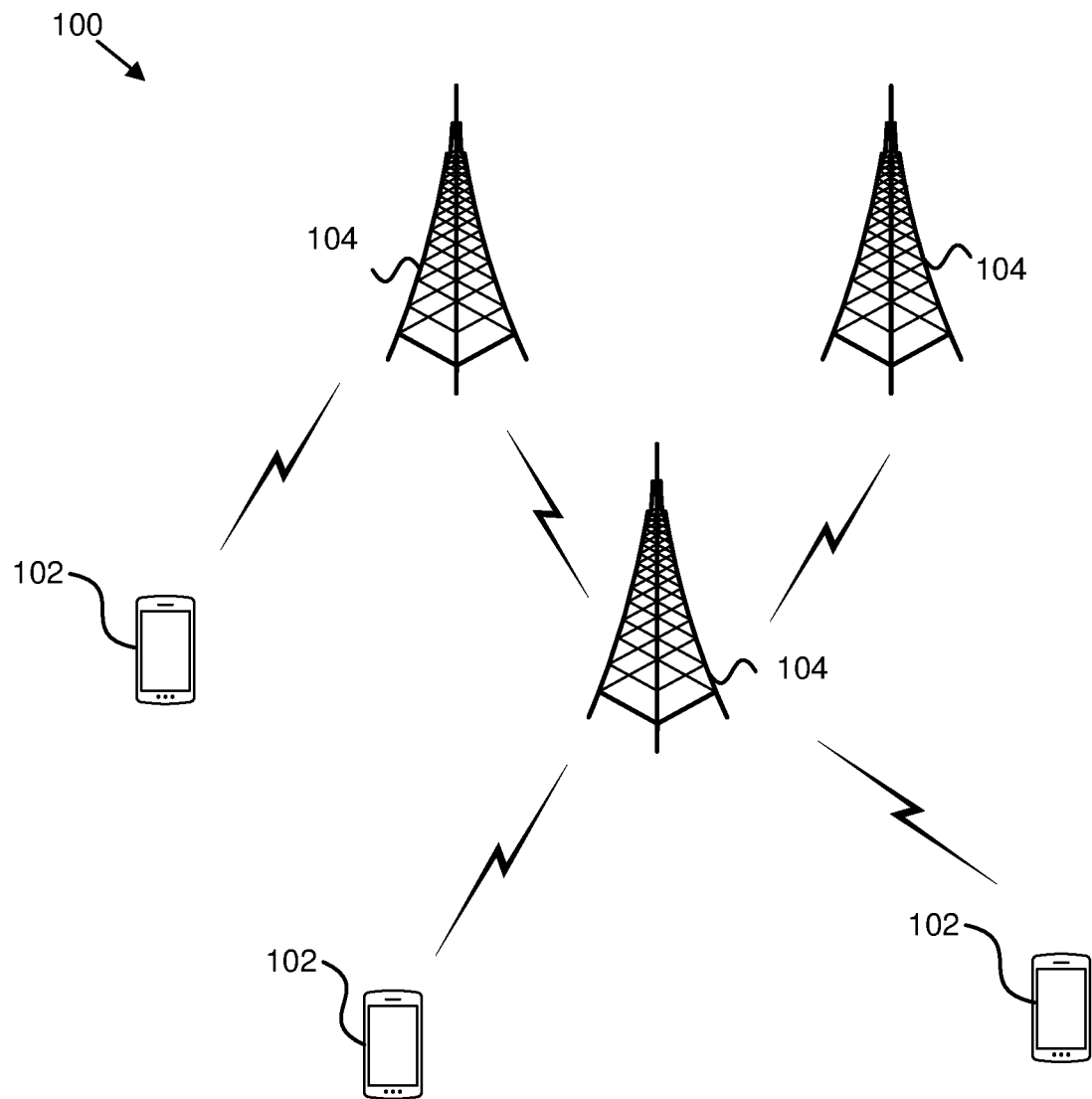
FIG. 1 is a schematic block diagram illustrating one embodiment of a wireless communication system for non-orthogonal communication.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for non-orthogonal communication. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may transmit a first signal to a first device for indicating a first resource in a control region of a carrier bandwidth. The first resource may be used by the first device for transmitting first control information, and the first control information may include first non-orthogonal layer information. The base unit 104 may receive the first control information from the first resource. The base unit 104 may also receive first data in a data region of the carrier bandwidth. The data region may include multiple non-orthogonal layers. The base unit 104 may decode the first control information. The base unit 104 may also decode the first data based on the first control information. Accordingly, a base unit 104 may receive non-orthogonal communication.

In another embodiment, a remote unit 102 may receive a signal for indicating a resource in a control region of a carrier bandwidth. The resource may be used to transmit control information, and the control information may include non-orthogonal layer information. The remote unit 102 may generate the control information and data corresponding to the control information. The remote unit 102 may also transmit the control information on the resource. The remote unit 102 may transmit the data in a data region of the carrier bandwidth. The data region may include multiple non-orthogonal layers. Accordingly, a remote unit 102 may transmit non-orthogonal communication.

Figure 2:
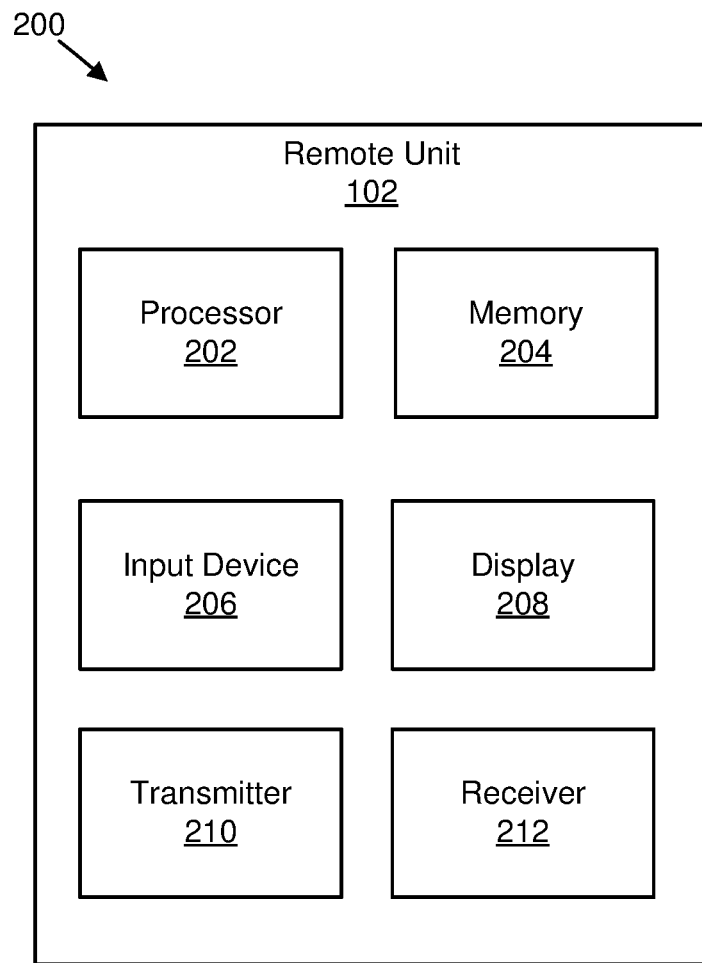
FIG. 2 is a schematic block diagram illustrating one embodiment of an apparatus that may be used for non-orthogonal communication.

FIG. 2 depicts one embodiment of an apparatus 200 that may be used for non-orthogonal communication. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may generate control information and data corresponding to the control information.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to an indication to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit control information on a resource, and transmit data in a data region of a carrier bandwidth. The data region may include multiple non-orthogonal layers. In certain embodiments, the receiver 212 may be used to receive a signal for indicating a resource in a control region of a carrier bandwidth. The resource may be used to transmit control information, and the control information may include non-orthogonal layer information. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
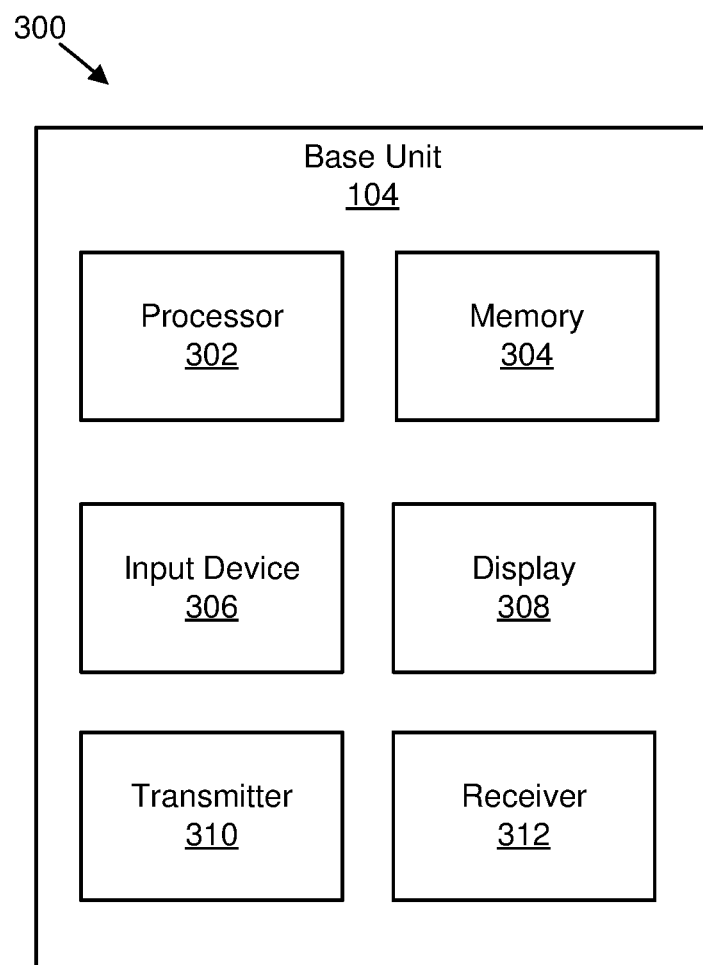
FIG. 3 is a schematic block diagram illustrating one embodiment of an apparatus that may be used for non-orthogonal communication.

FIG. 3 depicts one embodiment of an apparatus 300 that may be used for non-orthogonal communication. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively.

The processor 302 may be used to decode first control information, and to decode first data based on the first control information. The transmitter 310 may also be used to transmit a first signal to a first device for indicating a first resource in a control region of a carrier bandwidth. The first resource may be used by the first device for transmitting first control information, and the first control information may include first non-orthogonal layer information. The receiver 312 may be used to receive first control information from a first resource, and receive first data in a data region of a carrier bandwidth. The data region may include multiple non-orthogonal layers. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
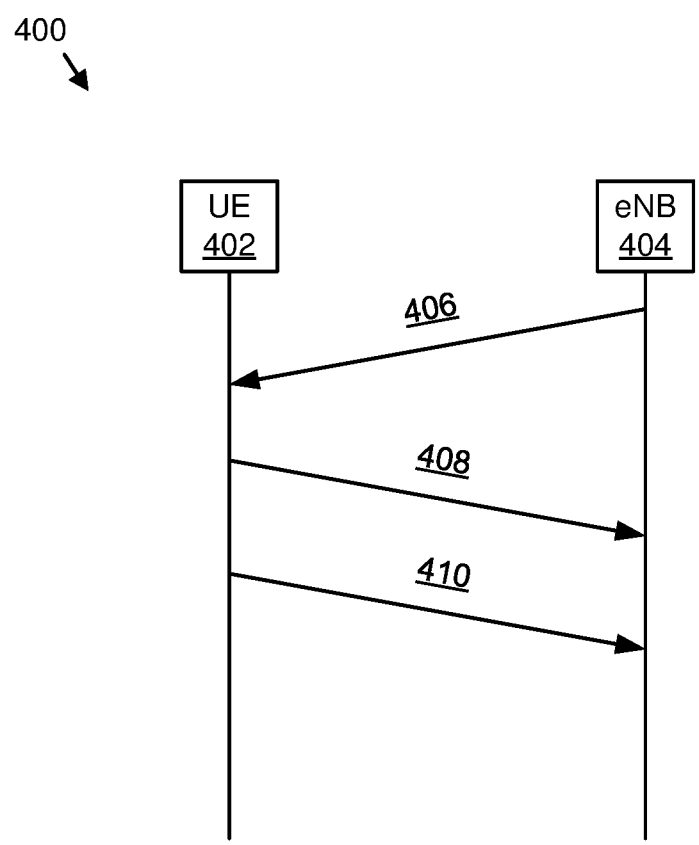
FIG. 4 illustrates one embodiment of communications for non-orthogonal communication.

FIG. 4 illustrates one embodiment of communications 400 for non-orthogonal communication. Specifically, communications 400 between a UE 402 and an eNB 404 are illustrated. A first communication 406 may include configuration information transmitted from the eNB 404 and received by the UE 402. In some embodiments, the configuration information is indicated by RRC signaling. The configuration information may include an indication of a resource to be used for transmissions, among other things.

Figure 5:
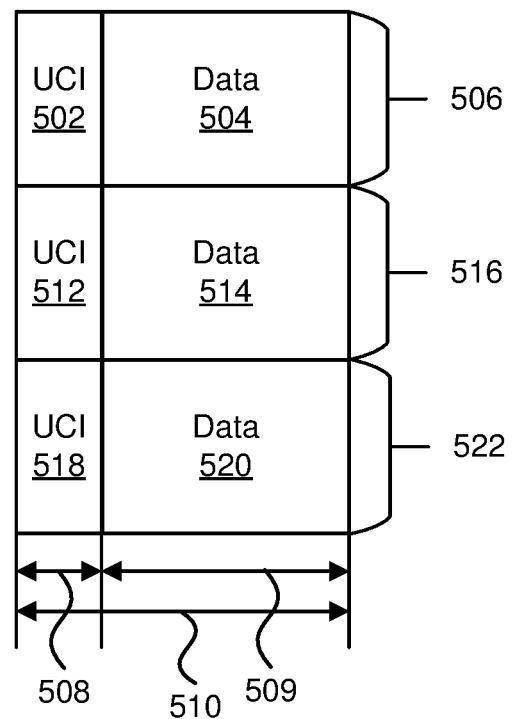
FIG. 5 illustrates one embodiment of non-orthogonal uplink transmissions.
Figure 6:
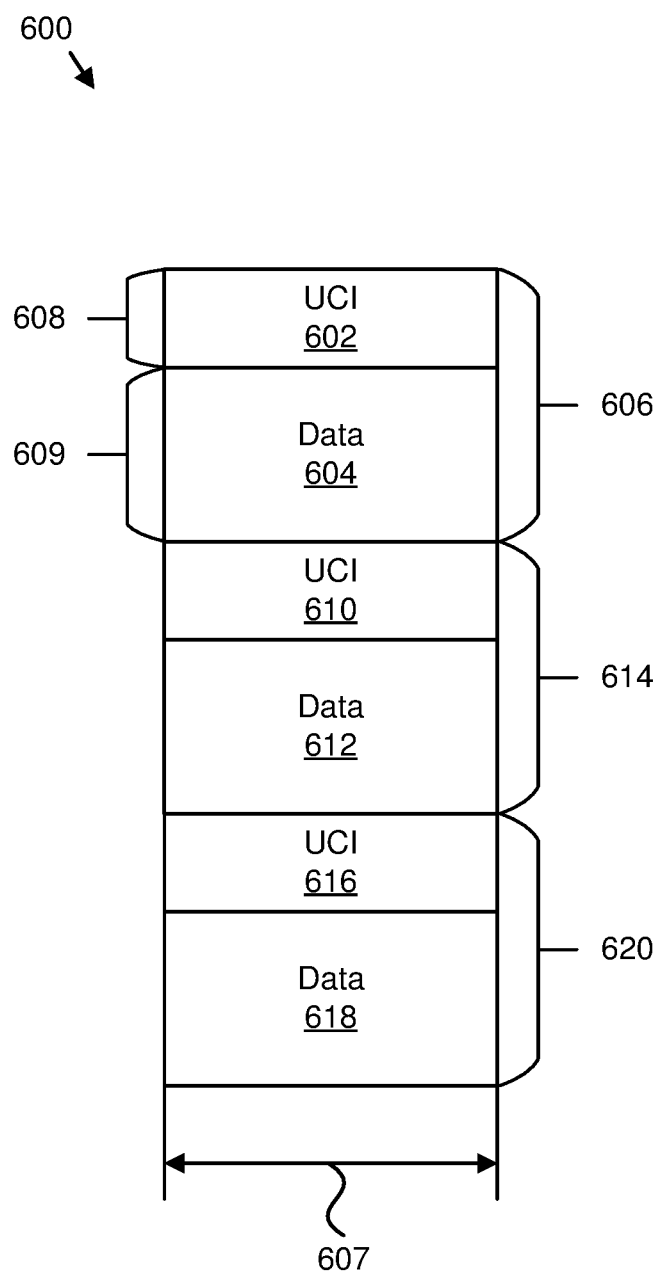
FIG. 6 illustrates another embodiment of non-orthogonal uplink transmissions.
Figure 7:
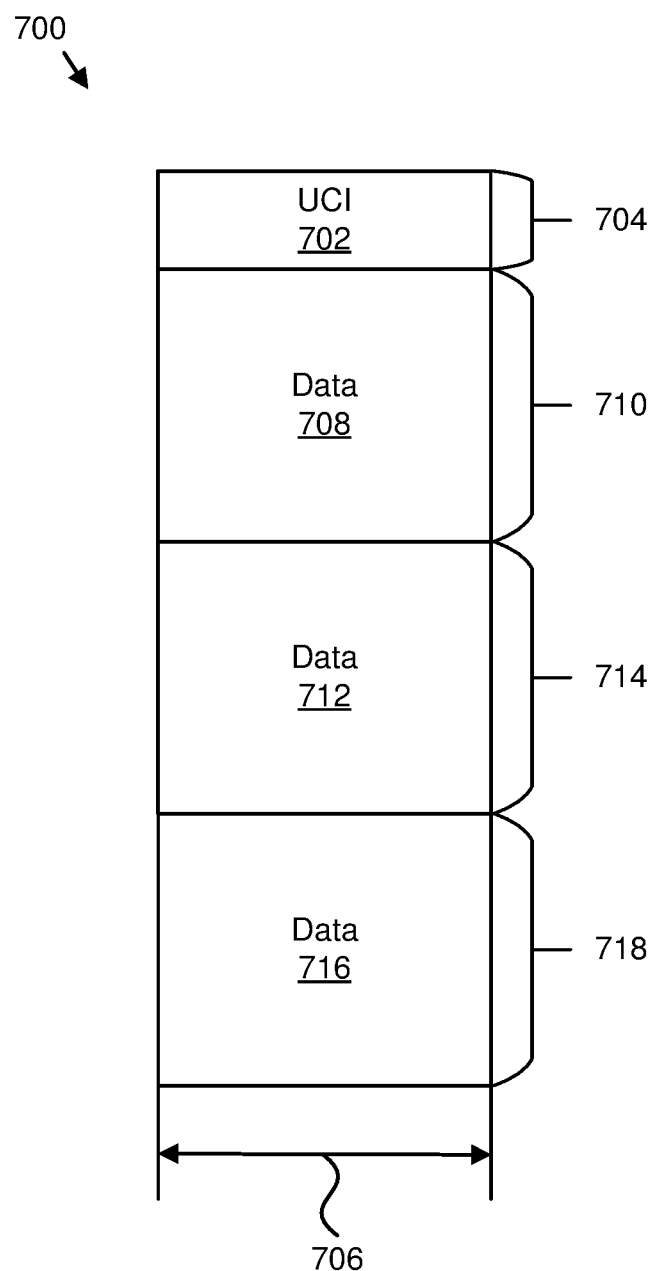
FIG. 7 illustrates a further embodiment of non-orthogonal uplink transmissions.

In certain embodiments, such as in embodiments using NOMA and/or UL grant-less transmission (e.g., for massive MTC ("mMTC") and URLLC), the system bandwidth may be pre-allocated and/or allocated with some region for mMTC or URLLC. For the bandwidth allocated for mMTC or URLLC, it may be partitioned into several subchannels that may have an equal bandwidth for each subchannel. Various examples are illustrated in FIGS. 5 through 7. The bandwidth, a concrete position in a frequency domain and/or a concrete position in a time domain may be configured by RRC signaling. To avoid resource fragmentation, the bandwidth for mMTC or URLLC may be contiguous in the frequency domain. In certain embodiments, a remaining part of the system bandwidth may be used for enhanced mobile broadband ("eMBB"). Moreover, in some embodiments, a filter is added to avoid inter-carrier interference ("ICI").

The bandwidth for each subchannel may be fixed in a specification and/or configured by RRC signaling. The bandwidths for each subchannel may be approximately (e.g., close but not necessarily exact) the same. Similarly, the duration for one subchannel in the time domain may be fixed in a specification and/or configured by RRC signaling. In one embodiment, one subchannel may have a fixed and/or preconfigured number of PRBs or REs in the frequency domain and/or a fixed or preconfigured number of symbols in the time domain.

A second communication 408 includes control information (e.g., uplink control information ("UCI")) transmitted from the UE 402 (e.g., remote unit 102) and received by the eNB 404 (e.g., base unit 104). In various embodiments, the control information may include a subchannel index, a number of subchannels, a hybrid automatic repeat request process identification, a new data indicator, a redundancy version, a modulation and coding scheme, a non-orthogonal layer index, and/or a hybrid automatic repeat request acknowledgment. A third communication 410 may include data transmitted from the UE 402 to the eNB 404.

Each subchannel may be shared by multiple UEs within the framework of NOMA. Moreover, one or more subchannels may be occupied by one UE based on the amount of UL data and/or predefined algorithm in UE. In some embodiments, a transmitted TB on each subchannel is independent from the others subchannels if one UE occupies several subchannels.

In various embodiments, the UCI for one transmitted TB is independent to the UCI for another transmitted TB (e.g., see FIG. 5, FIG. 6). In such embodiments, at the eNB 404 detection is processed in a unit of one subchannel. In some embodiment, only one TB is transmitted for a UE if the UE occupies more than one subchannels (e.g., see FIG. 7). In such an embodiment, the associated UCI may include the information of which subchannels are occupied by data. In one embodiment, a subchannel index that indicates occupied subchannels may be included in UCI. In another embodiment, a number of occupied subchannels may be included in the UCI and an index of the starting subchannel may also be included in the UCI.

In each subchannel, UL data may be transmitted with associated UCI. Moreover, the UCI may include information indicating one or more of a subchannel index (e.g., indicating a starting subchannel for data and/or specific subchannels including data), a number of subchannels, a hybrid automatic repeat request process identification, a new data indicator, a redundancy version, a modulation and coding scheme, a non-orthogonal layer index, and/or a hybrid automatic repeat request acknowledgment. The non-orthogonal layer index (or layer information for UL NOMA) may include any suitable information for indicating a layer on which data is to be transmitted. For example, the non-orthogonal layer index may correspond to a SCMA codeword if SCMA is used, a non-orthogonal complex spreading code index if MUSA or RSMA is used, a PDMA pattern index if PDMA is used, and so forth. In non-orthogonal multiple access, a set of resources comprising multiple resources in time domain and/or frequency domain can include multiple non-orthogonal layers and each layer is used for a user for data transmission. The layer may be distinguished by a predefined PDMA pattern vector in embodiments using PDMA, a SCMA codeword in embodiments using SCMA, or a scrambling code in embodiments using MUSA or RSMA.

In one embodiment, a SCMA codeword index may correspond to a SCMA codeword from a SCMA codebook. A SCMA codeword may be one column vector of a SCMA codebook and may be used to indicate available resources for data transmission by "1"s in the SCMA codeword. For example, if there are four resources for data transmission, a codeword of $(1\ 0\ 1\ 0)^T$ may indicate that a first and third resource of the four resources are used for data transmission, wherein "T" means transpose. As another example, if there are four resources for data transmission, a codeword of $(1\ 1\ 0\ 0)^T$ may indicate that a first and second resource of the four resources are used for data transmission. Moreover, in some embodiments, a PDMA pattern of $(1\ 0\ 0\ 0)^T$ may indicate that the first resource of four resources is used for data transmission, a pattern of $(1\ 1\ 0\ 0)^T$ may indicate that the first two resources of four resources are used for data transmission, and a pattern of $(1\ 1\ 1\ 0)^T$ may indicate that the first three resources of four resources are used for data transmission. In various embodiments, content of UCI may be dependent on a concrete design of multiplexing of UL data and associated UCI as well as a used NOMA scheme.

There may be many different options for multiplexing UL data and its associated UCI for a given UE in a grant-less mode.

In one embodiment, UCI and its associated data are included in each subchannel and multiplexed in the time domain. A number of symbols for the UCI may be fixed in a specification and/or configured by RRC signaling. This embodiment is illustrated in FIG. 5.

In another embodiment, UCI and its associated data are included in each subchannel and multiplexed in the frequency domain. A bandwidth of the UCI may include a fixed and/or preconfigured number of PRBs or REs in the frequency domain. This embodiment is illustrated in FIG. 6.

In a further embodiment, UCI and its associated data are multiplexed in the frequency domain but UCI is not included in the data subchannels. The bandwidth of the UCI region (e.g., control region) in the frequency domain may have a fixed and/or a preconfigured number of PRBs or REs. This embodiment is illustrated in FIG. 7. In this embodiment, the UCI information may indicate a subchannel index corresponding to a first and/or last subchannel for associated UL data transmission.

There may also be many different options for transmission of UL data and associated UCI for a given UE in grant-less mode.

In one embodiment, UCI and its associated UL data are both transmitted with a same NOMA scheme and on a same NOMA layer (e.g., a same SCMA codeword in embodiments in which SCMA is used, a same non-orthogonal complex spreading code in embodiments in which MUSA is used, a same PDMA pattern in embodiments in which PDMA is used, and so forth).

In another embodiment, UCI and its associated UL data are both transmitted with a same NOMA scheme, but on different NOMA layers. Because UCI transmission may use higher reliability than UL data, the UCI transmission may use a NOMA layer with a higher reliability than a NOMA layer used for UL data. For example, if SCMA is used, a SCMA codeword with low interference from other layers may be used for UCI while a SCMA codeword with high interference from other layers may be used for UL data associated with the UCI. As another example, if PDMA is used, a PDMA pattern with a high transmission diversity gain may be used for UCI while a PDMA pattern with low transmission diversity gain may be used for UL data associated with the UCI.

In a further embodiment, UCI and its associated UL data may be transmitted with different NOMA schemes. For example, in one embodiment, UCI transmission may use a NOMA scheme with a simpler detection algorithm to facilitate quickly decoding control information, while UL data transmission may use other more complicated NOMA schemes with more advanced detection algorithm to improve the combined performance. In one embodiment, UCI transmission may use RSMA while its associated UL data transmission may use SCMA, MUSA, or PDMA. Therefore, the eNB 404 may quickly decode UCI information then detect data associated with the UCI information based on the decoded UCI information.

In certain embodiments, UCI transmission may use an orthogonal resource to avoid collision with other UEs and its associated UL data transmission may use a NOMA scheme for grant-less transmission.

In various embodiments, a UE in a grant-less mode may be configured by the eNB 404 with a PUCCH resource index corresponding to one of the PUCCH resources when it enters the grant-less mode.

In one embodiment, a UCI and its associated data may be multiplexed in the frequency domain regardless of whether they are in the same subchannel (e.g., as shown in FIG. 6) or not in the same subchannel (e.g., as shown in FIG. 7). In certain embodiments, assume four consecutive PRBs in a frequency domain may be aggregated as one resource unit for data transmission on PUSCH and another one PRB may be used to transmit associated UCI on PUCCH. Using NOMA, the four PRBs may support a maximum of 12 UEs' UL data multiplexing with an overloading factor equal to 300%. The one PRB for UCI transmission may be used to transmit PUCCH format 2 because PUCCH format 2 may support up to 10 information bits for one UE and up to 12 UEs' UCI multiplexing in one PRB so as to support up to 12 UEs' PUSCHs multiplexing in one subchannel by NOMA.

In another embodiment, UCI and its associated data may be multiplexed in the time domain (e.g., as shown in FIG. 5). For example, one-symbol PUCCH may be used in this embodiment so that the UCI part including several symbols may provide multiple PUCCH resources. The concrete number of PUCCH resources may be dependent on the number of symbols configured for the UCI part and the number of PRBs configured for each subchannel. In this way, orthogonal resources may be configured for a UE for UCI transmission and non-orthogonal resource may be used for its associated UL data transmission.

To reduce a UCI payload size, layer-specific information for UL NOMA (e.g., a SCMA codebook index if SCMA is used, non-orthogonal complex spreading code index if MUSA is used, a PDMA pattern index if PDMA is used) may not be necessary to be included in the UCI and may be implicitly derived from a PUCCH resource index. In one embodiment, the PUCCH resource may be linked with the SCMA codeword (e.g., a PUCCH resource index is equal to SCMA codeword index). This may be feasible when one PRB is used to transmit PUCCH format 2 to provide up to 12 UEs' UCI multiplexing and four PRBs are used to convey up to 12 UEs' UL data by SCMA. Then a one-to-one mapping between a SCMA codeword index and a PUCCH resource index may be established. In certain embodiments, a SCMA codeword index may be derived from a PUCCH resource index mod the number of SCMA codewords. In one example, a UCI table without UL NOMA layer-specific information may be used as found in Table 1.

TABLE 1

| Parameter Name | Bit Width |
| --- | --- |
| HARQ Process ID | 3 |
| NDI | 1 |
| RV | 2 |
| MCS | 4 |
| Total | 10 |

In this way, the NR system using NOMA and grant-less/contention-based UL transmission may operate.

FIG. 5 illustrates one embodiment of non-orthogonal uplink transmissions 500. Specifically, UCI 502 and data 504 are transmitted in a first subchannel 506 and have an allocated bandwidth in the frequency domain. Moreover, the UCI 502 is transmitted in a control region 508, and the data 504 is transmitted in a data region 509. The control region 508 and the data region 509 occupy a TTI 510 in the time domain.

A UCI 512 and data 514 are transmitted in a second subchannel 516 and have the allocated bandwidth in the frequency domain. Furthermore, a UCI 518 and data 520 are transmitted in a third subchannel 522 and have the allocated bandwidth in the frequency domain.

FIG. 6 is a schematic block diagram illustrating another embodiment of non-orthogonal uplink transmissions 600. Specifically, UCI 602 and data 604 are transmitted in a first subchannel 606 and have an allocated bandwidth in the frequency domain. The UCI 602 and the data 604 each occupy a TTI 607 in the time domain. Moreover, the UCI 602 is transmitted in a control region 608 of the allocated bandwidth in the frequency domain (as well as other UCIs), and the data 604 is transmitted in a data region 609 of the allocated bandwidth in the frequency domain (as well as other data).

A UCI 610 and data 612 are transmitted in a second subchannel 614 and have the allocated bandwidth in the frequency domain. Furthermore, a UCI 616 and data 618 are transmitted in a third subchannel 620 and have the allocated bandwidth in the frequency domain.

FIG. 7 is a schematic block diagram illustrating a further embodiment of non-orthogonal uplink transmissions 700. Specifically, UCI 702 is transmitted in a control region 704 occupying a TTI 706 in the time domain. Moreover, data 708 is transmitted in a first subchannel 710 having an allocated bandwidth in the frequency domain. The data 708 also occupies the TTI 706 in the time domain.

Data 712 is transmitted in a second subchannel 714 and has the allocated bandwidth in the frequency domain. Furthermore, data 716 is transmitted in a third subchannel 718 and has the allocated bandwidth in the frequency domain. The data 708, 712, and 716 occupy a data region.

Figure 8:
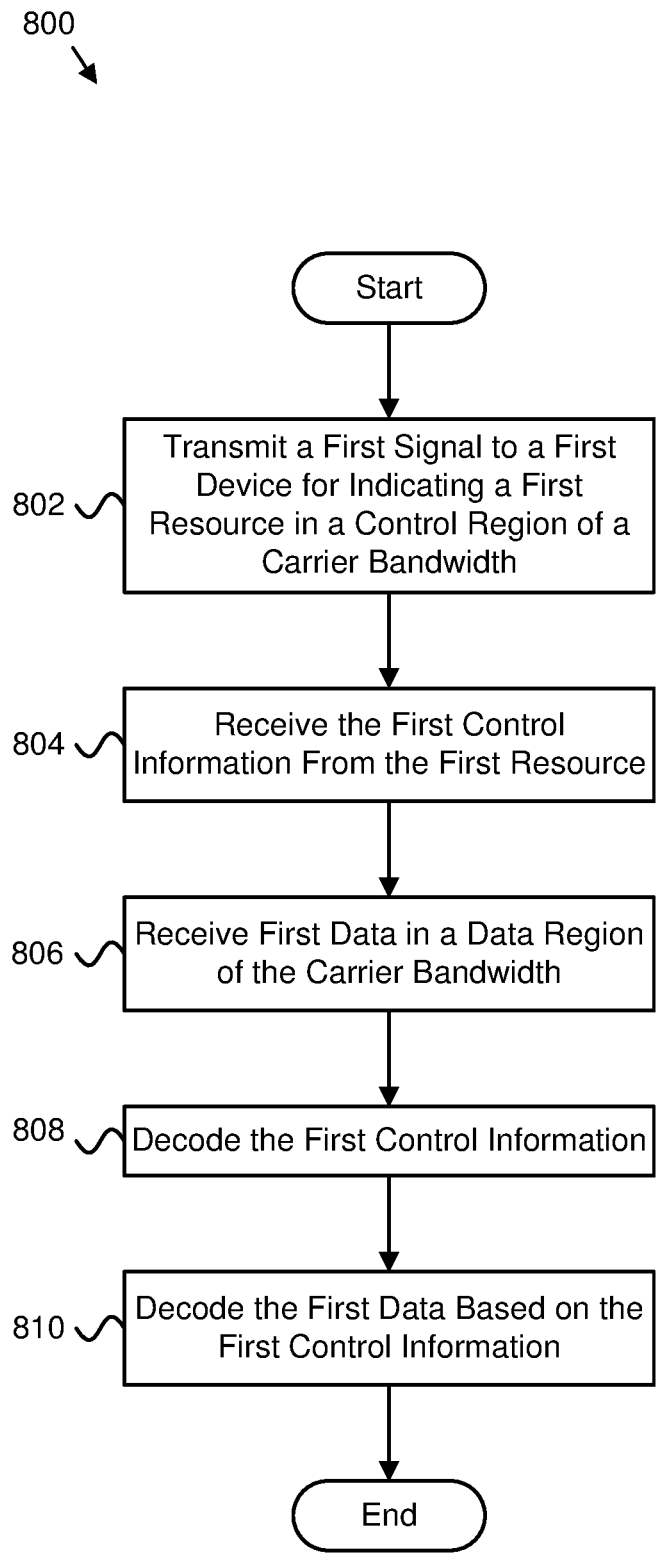
FIG. 8 is a schematic flow chart diagram illustrating one embodiment of a method for non-orthogonal communication.

FIG. 8 is a schematic flow chart diagram illustrating one embodiment of a method 800 for non-orthogonal communication. In some embodiments, the method 800 is performed by an apparatus, such as the base unit 104. In certain embodiments, the method 800 may be performed by a processor executing program code, for example, a microcontroller, a microprocessor, a CPU, a GPU, an auxiliary processing unit, a FPGA, or the like.

The method 800 may include transmitting 802 a first signal to a first device for indicating a first resource in a control region of a carrier bandwidth. In such an embodiment, the first resource may be used by the first device for transmitting first control information, and the first control information may include first non-orthogonal layer information. The method 800 also includes receiving 804 the first control information from the first resource. The method 800 includes receiving 806 first data in a data region of the carrier bandwidth. In such a method 800, the data region may include multiple non-orthogonal layers. The method 800 also includes decoding 808 the first control information. The method 800 includes decoding 810 the first data based on the first control information.

In one embodiment, the method 800 includes transmitting a second signal to a second device for indicating a second resource in the control region of the carrier bandwidth. In such embodiments, the second resource may be used by the second device for transmitting second control information, and the second control information may include second non-orthogonal layer information. In a further embodiment, the method 800 includes receiving the second control information from the second resource, and receiving second data in the data region of the carrier bandwidth. In such embodiments, the first data and the second data may be received on different non-orthogonal layers. In such embodiments, the processor may decode the second control information, and may decode the second data based on the second control information. In certain embodiments, the first resource and the second resource are different.

In some embodiments, the carrier bandwidth includes multiple subchannels, and a bandwidth of each subchannel of the multiple subchannels is approximately the same. In various embodiments, each subchannel of the multiple subchannels includes the control region and the data region, and the control region and the data region are multiplexed in a time domain. In certain embodiments, each subchannel of the multiple subchannels may include the control region and the data region, and the control region and the data region may be multiplexed in a frequency domain. In one embodiment, the carrier bandwidth includes the control region and the data region, the data region includes multiple subchannels, and a bandwidth of each subchannel of the multiple subchannels is approximately the same. In some embodiments, the first resource and the data region are on a same non-orthogonal layer. In various embodiments, the first resource and the data region are on different non-orthogonal layers.

In certain embodiments, the first control information includes information corresponding to: a subchannel index; a number of subchannels; a hybrid automatic repeat request process identification; a new data indicator; a redundancy version; a modulation and coding scheme; a non-orthogonal layer index; a hybrid automatic repeat request acknowledgment; or any combination thereof. In some embodiments, a non-orthogonal layer index corresponding to the first data is derived from an index of the first resource.

Figure 9:
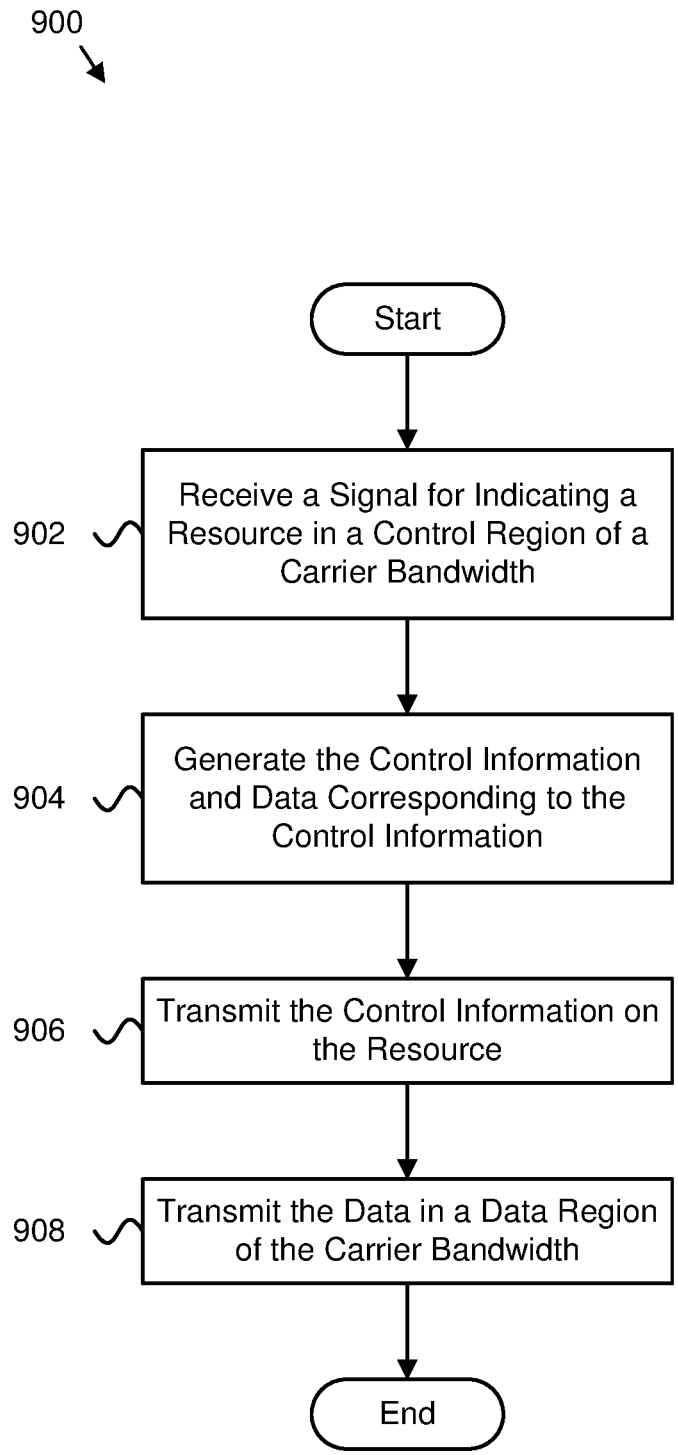
FIG. 9 is a schematic flow chart diagram illustrating another embodiment of a method for non-orthogonal communication.

FIG. 9 is a schematic flow chart diagram illustrating one embodiment of a method 900 for non-orthogonal communication. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include receiving 902 a signal for indicating a resource in a control region of a carrier bandwidth. In such an embodiment, the resource may be used to transmit control information, and the control information may include non-orthogonal layer information. The method 900 also includes generating 904 the control information and data corresponding to the control information. The method 900 includes transmitting 906 the control information on the resource. The method 900 includes transmitting 908 the data in a data region of the carrier bandwidth. In such embodiments, the data region may include multiple non-orthogonal layers.

In one embodiment, the carrier bandwidth includes multiple subchannels, and a bandwidth of each subchannel of the multiple subchannels is approximately the same. In a further embodiment, each subchannel of the multiple subchannels includes the control region and the data region, and the control region and the data region are multiplexed in a time domain. In some embodiments, each subchannel of the multiple subchannels includes the control region and the data region, and the control region and the data region are multiplexed in a frequency domain. In certain embodiments, the carrier bandwidth includes the control region and the data region, the data region includes multiple subchannels, and a bandwidth of each subchannel of the multiple subchannels is approximately the same.

In some embodiments, the resource and the data region are on a same non-orthogonal layer. In various embodiments, the resource and the data region are on different non-orthogonal layers. In certain embodiments, the control information includes information corresponding to: a subchannel index; a number of subchannels; a hybrid automatic repeat request process identification; a new data indicator; a redundancy version; a modulation and coding scheme; a non-orthogonal layer index; a hybrid automatic repeat request acknowledgment; or any combination thereof. In one embodiment, a non-orthogonal layer index corresponding to the data is derived from an index of the resource.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:

a transmitter that transmits a first signal to a first device for indicating a first resource in a control region of a carrier bandwidth, wherein the first resource is used by the first device for transmitting first control information, and the first control information comprises first non-orthogonal layer information;
a receiver that:
   receives the first control information from the first resource; and
   receives first data in a data region of the carrier bandwidth, wherein the data region comprises multiple non-orthogonal layers; and
a processor that:
   decodes the first control information; and
   decodes the first data based on the first control information.

2. The apparatus of claim 1, wherein the transmitter transmits a second signal to a second device for indicating a second resource in the control region of the carrier bandwidth, wherein the second resource is used by the second device for transmitting second control information, and the second control information comprises second non-orthogonal layer information.

3. The apparatus of claim 2, wherein:
the receiver:
   receives the second control information from the second resource; and
   receives second data in the data region of the carrier bandwidth, wherein the first data and the second data are received on different non-orthogonal layers; and
the processor:
   decodes the second control information; and
   decodes the second data based on the second control information.

4. The apparatus of claim 2, wherein the first resource and the second resource are different.

5. The apparatus of claim 1, wherein the carrier bandwidth comprises a plurality of subchannels, and a bandwidth of each subchannel of the plurality of subchannels is approximately the same.

6. The apparatus of claim 5, wherein each subchannel of the plurality of subchannels comprises the control region and the data region, and the control region and the data region are multiplexed in a time domain.

7. The apparatus of claim 5, wherein each subchannel of the plurality of subchannels comprises the control region and the data region, and the control region and the data region are multiplexed in a frequency domain.

8. The apparatus of claim 1, wherein the carrier bandwidth comprises the control region and the data region, the data region comprises a plurality of subchannels, and a bandwidth of each subchannel of the plurality of subchannels is approximately the same.

9. The apparatus of claim 1, wherein the first resource and the data region are on a same non-orthogonal layer.

10. The apparatus of claim 1, wherein the first resource and the data region are on different non-orthogonal layers.

11. The apparatus of claim 1, wherein the first control information comprises information corresponding to: a subchannel index; a number of subchannels; a hybrid automatic repeat request process identification; a new data indicator; a redundancy version; a modulation and coding scheme; a non-orthogonal layer index; a hybrid automatic repeat request acknowledgment; or any combination thereof.

12. The apparatus of claim 1, wherein a non-orthogonal layer index corresponding to the first data is derived from an index of the first resource.

13. A method comprising:
transmitting a first signal to a first device for indicating a first resource in a control region of a carrier bandwidth, wherein the first resource is used by the first device for transmitting first control information, and the first control information comprises first non-orthogonal layer information;
receiving the first control information from the first resource;
receiving first data in a data region of the carrier bandwidth, wherein the data region comprises multiple non-orthogonal layers;
decoding the first control information; and
decoding the first data based on the first control information.

14. An apparatus comprising:
a receiver that receives a signal for indicating a resource in a control region of a carrier bandwidth, wherein the resource is used to transmit control information, and the control information comprises non-orthogonal layer information;
a processor that generates the control information and data corresponding to the control information; and
a transmitter that:
   transmits the control information on the resource; and
   transmits the data in a data region of the carrier bandwidth, wherein the data region comprises multiple non-orthogonal layers.

15. The apparatus of claim 14, wherein the carrier bandwidth comprises a plurality of subchannels, and a bandwidth of each subchannel of the plurality of subchannels is approximately the same.

16. The apparatus of claim 15, wherein each subchannel of the plurality of subchannels comprises the control region and the data region, and the control region and the data region are multiplexed in a time domain.

17. The apparatus of claim 15, wherein each subchannel of the plurality of subchannels comprises the control region and the data region, and the control region and the data region are multiplexed in a frequency domain.

18. The apparatus of claim 14, wherein the carrier bandwidth comprises the control region and the data region, the data region comprises a plurality of subchannels, and a bandwidth of each subchannel of the plurality of subchannels is approximately the same.

19. The apparatus of claim 14, wherein the resource and the data region are on a same non-orthogonal layer.

20. The apparatus of claim 14, wherein the resource and the data region are on different non-orthogonal layers.

21. The apparatus of claim 14, wherein the control information comprises information corresponding to: a subchannel index; a number of subchannels; a hybrid automatic repeat request process identification; a new data indicator; a redundancy version; a modulation and coding scheme; a non-orthogonal layer index; a hybrid automatic repeat request acknowledgment; or any combination thereof.

22. The apparatus of claim 14, wherein a non-orthogonal layer index corresponding to the data is derived from an index of the resource.

23. A method comprising:
receiving a signal for indicating a resource in a control region of a carrier bandwidth, wherein the resource is used to transmit control information, and the control information comprises non-orthogonal layer information;
generating the control information and data corresponding to the control information;

transmitting the control information on the resource; and
transmitting the data in a data region of the carrier bandwidth, wherein the data region comprises multiple non-orthogonal layers.

* * * * *